J. P. SELSOR.
CORN PLANTER.

No. 65,771. Patented June 11, 1867.

Witnesses:
S. M. Randolph
Chas. H. Doyle

Inventor:
J. P. Selsor
M. Randolph & Co.
Attys

United States Patent Office.

JAMES P. SELSOR, OF CHERRY BOX, MISSOURI.

Letters Patent No. 65,771, dated June 11, 1867.

---

CORN-PLANTER.

---

The Schedule referred to in these Letters Patent and making part of the same.

---

TO ALL WHOM IT MAY CONCERN:

Be it known that I, JAMES P. SELSOR, of Cherry Box, in the county of Shelby, and State of Missouri, have invented a new and useful "Corn-Planter," which I hereby declare to be fully and faithfully described in the following specification, reference being had to the accompanying drawings, and to the letters of reference marked thereon.

This invention relates, firstly, to the ratchet-wheel attached to the inner side of one of the common wheels on which the machine is mounted; the said ratchet-wheel having lugs projecting from its inner face, which, as the wheel revolves, strike a lever that actuates the dropping machinery. The arrangement of these parts is such that the driver may turn over the ratchet to any desired point at which he wishes to commence dropping, thereby enabling him, at the commencement of each row, to set his machine in such a position as to drop the seeds in rows in both directions across the field.

There are other details in the arrangement of this machine, such, for instance, as the unshipping devices for starting and stopping the dropping machinery, and also a scraper for cleaning the wheels, which will be hereinafter more fully explained.

To enable those skilled in the art to make and use my improved "corn-planter," I will proceed to describe its construction and operation.

Figure 1 of the drawing is a sectional elevation of the machine, bisecting it.

Figure 1:
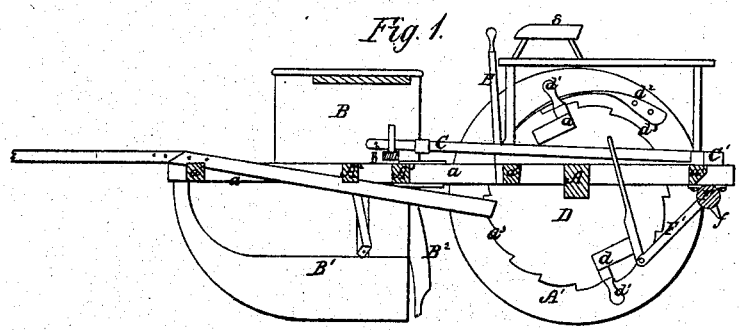
Figure 2:
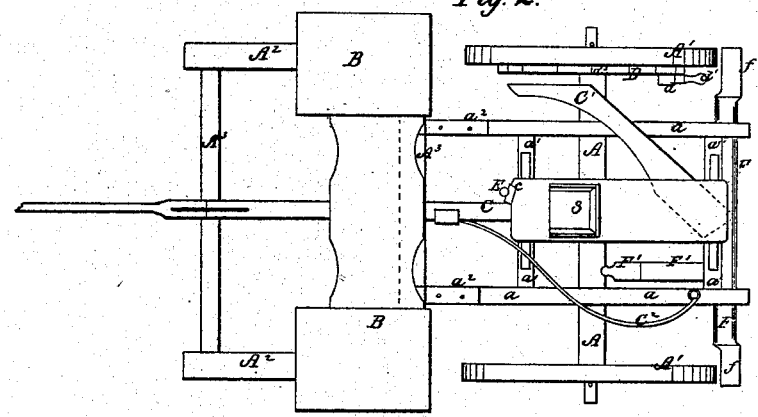
Figure 2 is a plan.
Figure 3:
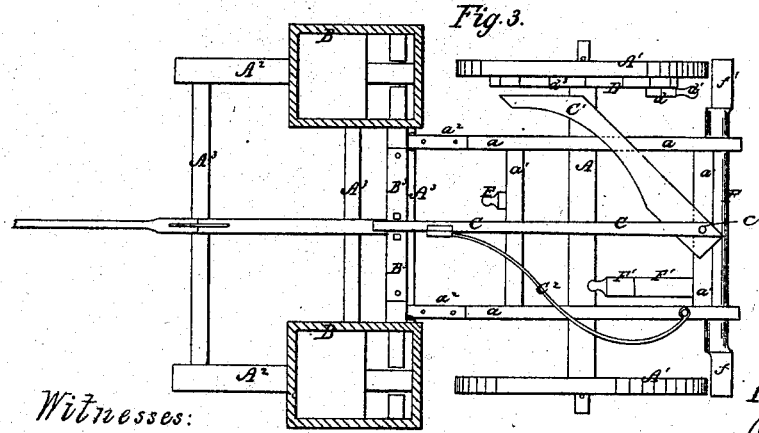
Figure 3 is a horizontal section, taken just below the seat.

A is an axle, on the outer ends of which are the wheels $A^1$ on which the principal part of the machine is mounted. The axle A and the two side-beams $a$, together with the transverse beams $a^1$, form a framework on which the other parts of the machine are supported. $A^2$ $A^3$ represents a framework on which the seed-hoppers B are placed. This frame and its hoppers are principally supported on the markers $B^1$ which open the furrows to receive the seeds. As there is nothing particularly new in these markers or the seed-tubes $B^2$ leading from the hoppers to the heels of the markers, they will not be herein minutely described. Neither is there anything materially different in the seed-hoppers, or the reciprocating bar $B^3$ which takes the seeds from them, from the machines now in use. The forward ends of the beams $a$ are connected, by means of the straps $a^2$, with the beam $A^2$ of the hopper-frame, so that there may be a vertical rocking-joint at this point. The reciprocating bar $B^3$ is operated by the forked lever C $C^1$, which is pivoted to the frame at $c$, and thrown to one side by the action of the spring $C^2$, and to the other side by the action of the lugs $d$ on the ratchet D, which, as the said wheel revolves, strike the side of the lever $C^1$ near its projecting end, and so cause a reciprocating motion to the aforesaid bar $B^3$. The ratchet-wheel D is loose on the axle A, and the driver, as he sits upon his seat S, can easily seize one of the arms $d^1$ and turn the ratchet ahead, so as to set it in the proper position for its lug $d$ to strike the lever $C^1$ in such a point of time as to cause the motion of the bar $B^3$ to be such as to drop the seeds in rows transversely to the path of the machine as well as in the direction in which the machine is travelling. It will be necessary for the driver to set the ratchet at the commencement of its journey on each side of the field. The spring $d^2$ is fastened to the wheel $A^1$, and takes hold of the teeth $d^3$ of the ratchet, as a pawl, to prevent it from turning backward, and to compel it to turn forward with the wheel $A^1$ as it revolves. The lugs $d$ are reduced to a feather edge where their forward ends join the face of the ratchet, and from this point they rise gradually until their back ends are of sufficient thickness to move the levers the required distance. When it is desired to stop the dropping machinery the lever E may be thrown up in the notch $e$ on the front end of the driving-seat frame, where it will press the levers C $C^1$ off, so the lugs $d$ cannot strike the lever. The wheels $A^1$, while travelling over the ploughed ground, will be apt to clog on their peripheries, and to remove the dirt so accumulated, and thereby ease the working of the machine, I introduce a scraper, F, which is swung under or hinged to the back ends of the beams $a$, and is operated by the hand-lever $F^1$. On the outer end of the shaft F are two shovels or blades $f$, which, when the lever is pressed down, strike the periphery of the wheels, so as to remove any dirt that may be clogged thereon. When the lever is raised up the shovels or blades are released from the wheels.

Having described my invention, what I claim, is—

The employment of the ratchet D, substantially in the manner herein described and set forth.

I also claim the combination and arrangement of the wheel $A^1$ and the ratchet D, the lever C $C^1$ and the spring $C^2$.

JAS. P. SELSOR.

Witnesses:
 CHAS. H. BOYLE,
 S. M. RANDOLPH.